(12) United States Patent
Roehle

(10) Patent No.: US 11,281,174 B2
(45) Date of Patent: Mar. 22, 2022

(54) MODULE FOR INDUSTRIAL PROCESS AUTOMATION AND METHOD FOR OPERATION AND CONFIGURATION

(71) Applicant: Siemens Aktiengesellschaft, Munich (DE)

(72) Inventor: Holger Roehle, Burkhardtsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 148 days.

(21) Appl. No.: 16/290,312

(22) Filed: Mar. 1, 2019

(65) Prior Publication Data

US 2019/0271960 A1 Sep. 5, 2019

(30) Foreign Application Priority Data

Mar. 2, 2018 (EP) .................................. 18159717

(51) Int. Cl.
*G06F 16/00* (2019.01)
*G05B 19/042* (2006.01)
*G05B 19/418* (2006.01)

(52) U.S. Cl.
CPC ..... *G05B 19/0423* (2013.01); *G05B 19/4183* (2013.01)

(58) Field of Classification Search
CPC ..................................................... G06F 16/00
See application file for complete search history.

(56) References Cited

U.S. PATENT DOCUMENTS

| 2013/0124575 | A1  | 5/2013  | Plache et al. |
| 2013/0226944 | A1* | 8/2013  | Baid ........................ G06F 16/88 707/756 |
| 2015/0381738 | A1* | 12/2015 | Azuma ................... G06Q 50/04 702/188 |
| 2017/0261969 | A1* | 9/2017  | Peake ............... G05B 19/41835 |

FOREIGN PATENT DOCUMENTS

DE         102010027963        10/2011

* cited by examiner

*Primary Examiner* — Khanh B Pham
(74) *Attorney, Agent, or Firm* — Cozen O'Connor

(57) ABSTRACT

A method and module for industrial process automation for acquiring measured values, wherein the measured value datasets have an identifier for each measured value, and an assignment table for cyclical data and an assignment table for acyclical data are present, which have a user-defined data structure created by a configurer via a configuration tool.

9 Claims, 4 Drawing Sheets

MODULE FOR INDUSTRIAL PROCESS AUTOMATION AND METHOD FOR OPERATION AND CONFIGURATION

BACKGROUND OF THE INVENTION

1. Field of the Invention

The invention relates to a module for industrial process automation for acquiring measured values, comprising an interface for communication with other modules and/or a higher-level controller, a microcontroller, terminals for measurement lines, at least one analog-digital converter, where the microcontroller is configured to store the measured values formed via the analog-digital converter in a measured value dataset or in a plurality of measured value datasets, and where the microcontroller is furthermore to calculate further parameters or characteristic variables relating to the measured values from the measured values based on calculation rules and to store the parameters or characteristic variables in the measured value datasets.

The invention also relates to a method for configuring a module for industrial process automation for acquiring measured values with a configuration tool and for connecting and operating the module, in which case measured values formed in the module via an analog-digital converter are stored in a measured value dataset or in a plurality of measured value datasets via a microcontroller, and in addition further parameters or characteristic variables relating to the measured values are calculated from the measured values based on calculation rules and the parameters or characteristic variables are likewise stored in the measured value datasets.

2. Description of the Related Art

Particularly in industrial process automation, complex measuring systems may deliver a large amount of data and measured values. A user, according to his specific application case, has vastly different requirements as to which measured values or data he requires from the large amount of measured values for his particular application case.

A conventional measurement module has an interface for cyclical input data or output data with a specified length (e.g. 32 bit input) and a fixed structure. Generally, additional measured data can only be retrieved acyclically by additional transport protocols (e.g., dataset, field bus). Even this approach can only cover a minority of measured values and again generally delivers a data structure defined in a fixed manner. In the conventional measurement module, an address space is available for an analog input module AI 4×I 2-/4-wire ST, for example. The address space makes eight input bytes available, for example. Thus, input values or output values for a channel 0 to channel 3 are available.

SUMMARY OF THE INVENTION

It is an object of the present invention to provide a simplified option for an existing module, which provides a large number of parameters and measured values for a user in process automation, and provides the associated measured values for its specific application case.

For the inventive module, the invention is achieved in that the measured value datasets have an identifier for each measured value and parameter or characteristic variable, and that an assignment table for cyclical data and an assignment table for acyclical data are present, where the interface and the microcontroller are furthermore configured such that a conversion rule created by a configurer can be loaded via a configuration tool, and that furthermore a user-defined data structure for the assignment table for cyclical data and a user-defined data structure for the assignment table for acyclical data can be generated from the data structure of the measured value datasets using the conversion rule, where a process map memory is present, from which the user-defined data structures can be read, and where the microcontroller is furthermore configured to copy the user-defined data from the assignment tables into the process map memory.

Advantageously, a standardized rule or a standardized configuration rule has now been devised for all measured values which the module provides. With this invention, all measured values can be addressed in accordance with a standardized rule via the use of the measured value identifiers. In this context it is irrelevant whether the module provides 100 or 600 different measured values. For a plant operator, it is now possible to configure his main measured values to be cyclically checked in a variable manner, specifically in accordance with his requirements. The input lengths and the configuration of the structure are specified in the assignment tables.

In an embodiment of the invention, a plurality of assignment tables for cyclical data and a plurality of assignment tables for acyclical data in the module are provided, where the assignment tables have an assignment table index, which can be queried or predefined by a user, in which case the microcontroller is furthermore configured such that only the assignment table queried via the assignment table index in each case is copied into the process map memory.

Furthermore, it is particularly advantageous for acyclical data if a data block transmitting facility is present, which is configured to transmit a user-specific data structure as acyclical data from the assignment table on request. In this context, it is furthermore advantageous if the user-specific data structure is structured according to the Open Platform Communication Unified Architecture (OPC UA) communication model.

For the inventive method, the object is achieved in that in the configuration tool for the measured value datasets an identifier is shown for each measured value and parameter or characteristic variable, where the configurer chooses data from a plurality of, possibly different, measured value datasets and thus differently structured data sources and consolidates it into assignment tables for user-defined data structures and the user-defined data structures are saved, based on a conversion rule, in a process map memory, via which they are read out.

Furthermore, the invention makes provision for a plurality of assignment tables to be used, and assigning the assignment tables an assignment table index, which is queried or can be predefined by a user, and as a result only the assignment table queried via the assignment table index in each case can be copied into the process map memory.

In order to simplify the configuration of the module with the large number of measured values for a configurer, a graphical tool is utilized in the configuration tool in order to make it easier for the configurer to draw lines between the fields of the data structure from the measured value datasets to fields of the user-defined data structures and thus to form the conversion rule and/or the assignment tables. Such assignment tools could also automatically, by button press, detect the relationship of the fields based on their names and value ranges. These programs automatically generate an OPC UA data structure code from the defined relationships, for example. Such tools are mostly part of ETL tools (ETL:

data flow and supporting program extraction). Extract, transform, load (ETL) is a process in which data from a plurality of possibly differently structured data sources is consolidated in a target database.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, one possible exemplary embodiment is described, in which.

DETAILED DESCRIPTION OF THE EXEMPLARY EMBODIMENTS

Figure 1:
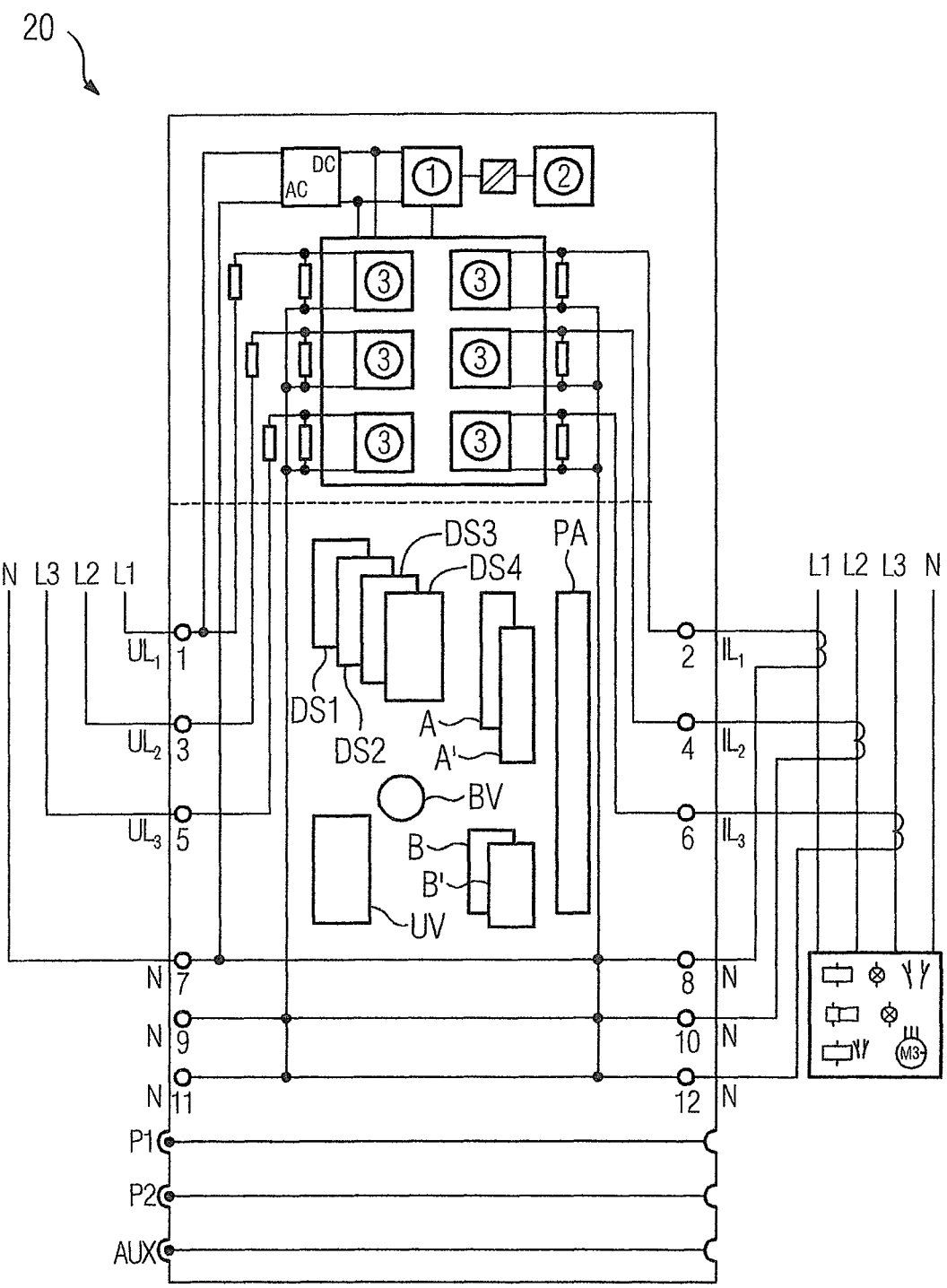
FIG. 1 shows a module for acquiring measured values in accordance with the invention.

In accordance with FIG. 1, a module 20 is shown for industrial process automation for acquiring measured values UL1,IL1; UL2,IL2; UL3,IL3. The measured voltage and current values, acquired in an analog manner, are converted into digital values within the module by a plurality of analog-digital converters 3. By way of a microcontroller 1, it is possible in the module 20 to store the converted digitalized measured values in a first measured value dataset DS1, a second measured value dataset DS2, a third measured value dataset DS3 and in a fourth measured value dataset DS4. The module 20 is an intelligent technology module, with which it is possible to additionally compute phase angle, performances, energy/electrical work, frequencies, minimum/maximum values, performance factors, operating hours, or limit values from the acquired basic measured values of voltage and current. The cited additional values correspond with the parameters or characteristic variables that are determined based on the calculation rules BV within the module 20 and are likewise stored in the measured value datasets DS1, DS2, DS3, DS4. Using the calculation rule BV, a large number of measured values or characteristic variables and parameters thus emerge in a simple manner, with a user not necessarily requiring all of these for his specific application case.

In order to make things easier for the user, the module is now accordingly developed such that the measured value datasets DS1, DS2, DS3, DS4 have an identifier ID for each measured value and parameter or characteristic variable. Furthermore, the module 20 has an assignment table A for cyclical data and an assignment table B for acyclical data. An interface 2 interacts with the microcontroller 1 such that a configurer 25 (see FIG. 2) generates a conversion rule UV with a configuration tool 24 and loads the conversion rule UV into the module 20 via the interface 2. With the aid of the conversion rule UV and the assignment table A, user-specific data may now be loaded into a process map memory PA. In turn, process map memory PA can be read out by the microprocessor 1 and provide the process map data via the interface 2 to further participants or a higher-level control facility 21.

Specifically, the module 20 is conceived as an energy meter for a machine-oriented use in a decentralized peripheral system. The energy meter acquires various electrical measured and energy values.

Figure 2:
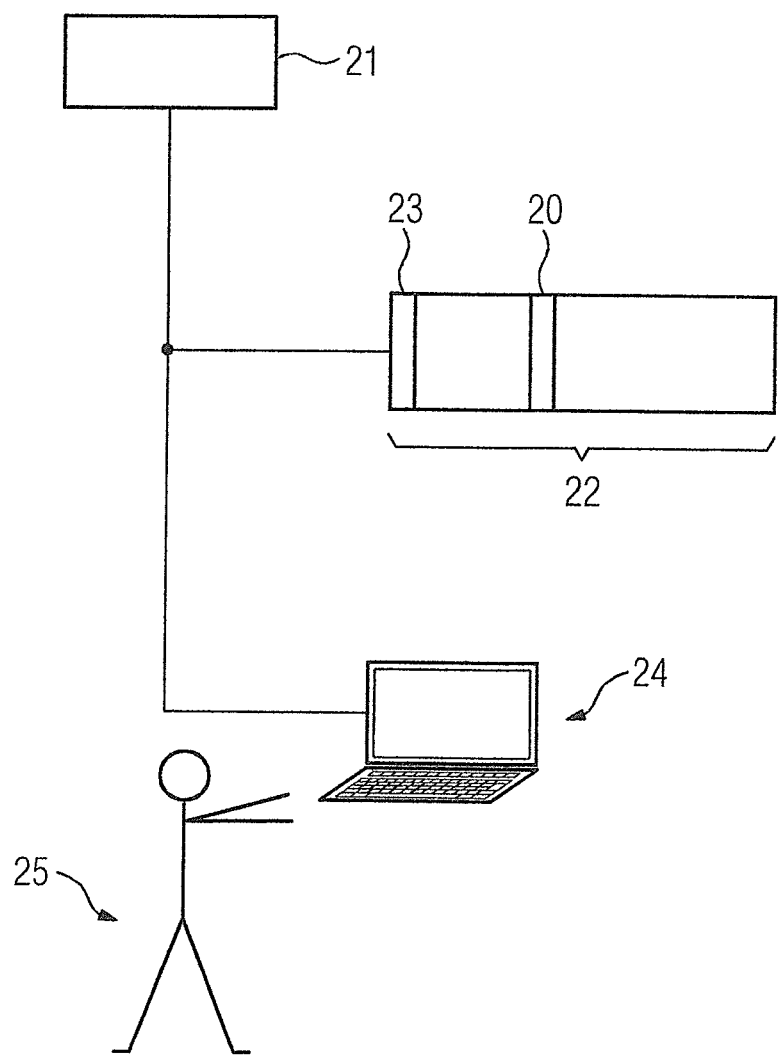
FIG. 2 shows the module known from FIG. 1 in a cluster with a configuration tool and a higher-level controller in accordance with the invention.

With reference to FIG. 2, shown therein is the use of the module 20 within a decentralized peripheral system 22. The decentralized peripheral system 22 is connected to a fieldbus 26 via a bus connection 23. The fieldbus 26 in turn is connected to a higher-level control facility 21 and a configuration tool 24.

The configuration tool 24 is used by a configurer 25. In the configuration tool 24, an identifier ID is shown for the measured value datasets DS1, DS2, DS3, DS4 for each measured value and parameter or characteristic variable. The configurer 25 can now choose data from a plurality of, possibly different, measured value datasets DS1, DS2, DS3, DS4 and thus from differently structured data sources and consolidate it in a user-specific manner in an assignment table A, A' for user-defined data structures. The user-defined data structures are then saved into a process map memory PA based on a conversion rule UV in the module 20.

Figure 3:
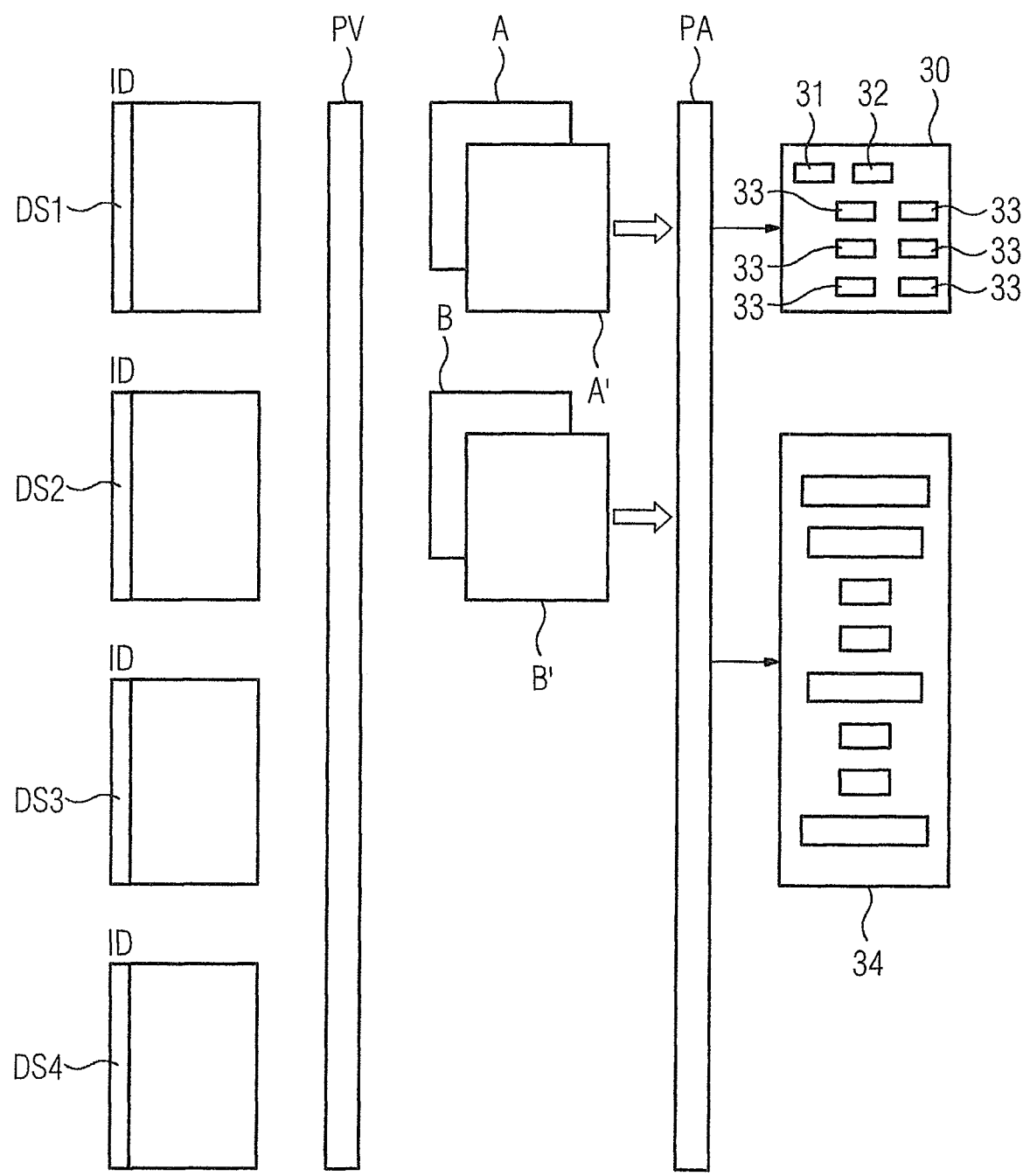
FIG. 3 shows a principle sketch of the mapping of the data structures to user-specific data structures.

FIG. 3 shows the conversion of the data structure in principle. Saved in the measured value datasets DS1, DS2, DS3, DS4 are a large number of measured values, parameters and characteristic variables. A user of an industrial automation plant generally requires only some of these measured values. A configurer 25 can now search for those measured values and data structures based on the ID with the aid of the configuration tool 24 in a configuration procedure PV and parameterize or configure these in the assignment table A for cyclical data and in the assignment table B for acyclical data. The data recorded in the assignment tables A, B is copied into a process map PA with the aid of a conversion rule UV and, for example, shown to a machine operator on an HMI device in a display field 30. The display field 30 has output fields 33 for this purpose. As one special characteristic, the display field 30 makes provision for a first button 31 and a second button 32. With the first button 31, a plant operator chooses a previously specified assignment table index ZI, he is then shown the data structure in its display field 30, which is recorded in the first assignment table A and, if he selects the second button 32, he then chooses, for example, an assignment table index ZI=2 and he is shown in its display field 30 the structured data which is recorded in the second assignment table A'.

In the assignment table B for acyclical data, data structures are advantageously recorded, such as provided in the data format of the OPC UA specification. These data structures may also be shown on an Human Machine Interface (HMI) device as a complete data structure 34.

Figure 4:
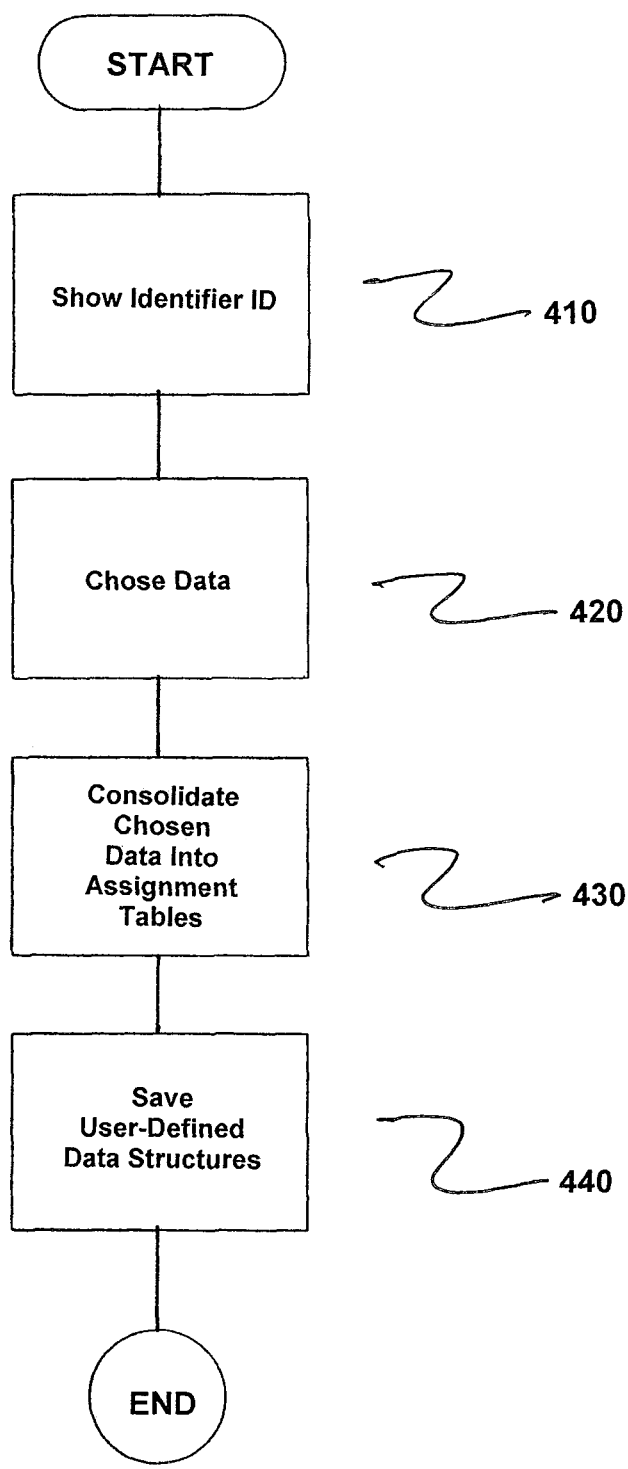
FIG. 4 is a flowchart of the method in accordance with the invention.

FIG. 4 is a flowchart of the method for configuring a module 20 for industrial process automation for acquiring measured values UL1,IL1 with a configuration tool 24 and subsequent operation of the module 20, where case measured values UL1,IL1 formed in the module 20 via an analog-digital converter 3 are stored in a measured value dataset DS1 or in a plurality of measured value datasets DS1, DS2, DS3, DS4 via a microcontroller 1, and further parameters or characteristic variables relating to the measured values UL1,IL1 are calculated from the measured values UL1,IL1 based on calculation rules BV and said parameters or characteristic variables are likewise stored in the measured value datasets DS1, DS2, DS3, DS4. The method comprises showing an identifier ID in the configuration tool 25 for the measured value datasets DS1, DS2, DS3, DS4 for each measured value UL1,IL1 and parameter or characteristic variable, as indicated in step 410.

Next, data from a plurality of, possibly different, measured value datasets DS1, DS2, DS3, DS4 and thus differently structured data sources is chosen by a configurer 25, as indicated in step 420.

Next, the chosen data is consolidated into assignment tables A,A' for user-defined data structures, as indicated in step 430.

The user-defined data structures are now saved, based on a conversion rule UV, in a process map memory PA, via which the user-defined data structures are read out, as indicated in step 440.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A module for industrial process automation for acquiring measured values, comprising:
    an interface for communication with at least one of other modules and a higher-level controller;
    terminals for measurement lines;
    at least one analog-digital converter;
    a microcontroller configured to store the measured values formed via the analog-digital converter in one of (i) a measured value dataset and (ii) a plurality of measured value datasets, the microcontroller being further configured to calculate further parameters or characteristic variables relating to the measured values from the measured values based on calculation rules and to store said parameters or characteristic variables in the measured value datasets; and
    an assignment table including input lengths and a configuration of a user-defined data structure, and cyclical data and an assignment table including input lengths and the configuration of the user-defined data structure, and acyclical data;
    wherein the measured value datasets have an identifier for each measured value and parameter or characteristic variable;
    wherein the interface and the microcontroller are furthermore configured such that a conversion rule created by a configurer is loadable via a configuration tool, and such that the user-defined data structure for the assignment table including the cyclical data and the user-defined data structure for the assignment table including the acyclical data can be generated from the data structure of the measured value datasets using the conversion rule;
    wherein the module further includes a process map memory from which the user-defined data structures is readable; and
    wherein the microcontroller is furthermore configured to copy the user-defined data from the assignment tables into the process map memory.

2. The module as claimed in claim 1, wherein the module includes a plurality of assignment tables for cyclical data and a plurality of assignment tables for acyclical data; wherein each of the assignment tables has an assignment table index, which can be queried by a user, the microcontroller being further configured such that only each assignment table queried via the assignment table index is copied into the process map memory.

3. The module as claimed in claim 1, further comprising:
    a data block transmitting facility which is configured to transmit the user-specific data structure as acyclical data from the assignment table upon request.

4. The module as claimed in claim 2, further comprising:
    a data block transmitting facility which is configured to transmit the user-specific data structure as acyclical data from the assignment table upon request.

5. The module as claimed in claim 3, wherein the user-specific data structure is structured in accordance with the Open Platform Communications Unified Architecture (OPC UA) communication model.

6. A method for configuring a module for industrial process automation for acquiring measured values with a configuration tool and subsequent operation of the module which communicates with at least one of other modules and a higher-level controller via an interface, measured values formed in the module via an analog-digital converter being stored in a measured value dataset or in a plurality of measured value datasets via a microcontroller, and further parameters or characteristic variables relating to the measured values being calculated from the measured values based on calculation rules and said parameters or characteristic variables are likewise stored in the measured value datasets, the method comprising:
    showing an identifier in the configuration tool for the measured value datasets for each measured value and parameter or characteristic variable;
    choosing, by a configurer, data from a plurality of, possibly different, measured value datasets and thus differently structured data sources;
    consolidating said chosen data into assignment tables for user-defined data structures; and
    saving the user-defined data structures, based on a conversion rule, in a process map memory, via which said user-defined data structures are read out;
    wherein the module includes an assignment table including input lengths and a configuration of a user-defined data structure, and cyclical data and an assignment table including input lengths and the configuration of the user-defined data structure, and acyclical data; and
    wherein the interface and the microcontroller are configured such that a conversion rule created by a configurer is loadable via a configuration tool, and such that the user-defined data structure for the assignment table including the cyclical data and the user-defined data structure for the assignment table including the acyclical data can be generated from the data structure of the measured value datasets using the conversion rule.

7. The method as claimed in claim 6, wherein a plurality of assignment tables are utilized and the assignment tables are assigned an assignment table index, which is queried by a user, such that only each assignment table queried via the assignment table index is copied into the process map memory.

8. The method as claimed in claim 6, wherein a graphical tool is used in the configuration tool to enable the configurer to draw lines between fields of the data structure from the measured value datasets to fields of the user-defined data structures so as to form at least one of (i) the conversion rule and (ii) the assignment tables.

9. The method as claimed in claim 7, wherein a graphical tool is used in the configuration tool to enable the configurer to draw lines between fields of the data structure from the measured value datasets to fields of the user-defined data structures so as to form at least one of (i) the conversion rule and (ii) the assignment tables.

\* \* \* \* \*